United States Patent
Kaji et al.

(10) Patent No.: US 8,762,677 B2
(45) Date of Patent: Jun. 24, 2014

(54) INFORMATION PROCESSING SYSTEM FOR TRANSMITTING SETTINGS INFORMATION FROM A PARENT PROCESSING APPARATUS TO A CHILD PROCESSING APPARATUS, INFORMATION PROCESSING METHOD, AND NON-TRANSITORY COMPUTER READABLE MEDIUM

(75) Inventors: Masaya Kaji, Kanagawa (JP); Akihito Toyoda, Kanagawa (JP); Takashi Aoki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 262 days.

(21) Appl. No.: 13/236,774

(22) Filed: Sep. 20, 2011

(65) Prior Publication Data

US 2012/0246417 A1  Sep. 27, 2012

(30) Foreign Application Priority Data

Mar. 25, 2011  (JP) .................................. 2011-068344

(51) Int. Cl.
*G06F 12/00*  (2006.01)
(52) U.S. Cl.
USPC ..... 711/170; 711/154; 711/156; 711/E12.001
(58) Field of Classification Search
USPC ........................... 711/170, 154, 156, E12.001
See application file for complete search history.

(56) References Cited

U.S. PATENT DOCUMENTS

2004/0210646 A1 * 10/2004 Sushima et al. ............... 709/220
2004/0230842 A1 * 11/2004 Osada ........................... 713/202

FOREIGN PATENT DOCUMENTS

| JP | 2000-033754 A | 2/2000 |
|---|---|---|
| JP | 2007-011704 A | 1/2007 |

* cited by examiner

*Primary Examiner* — Mardochee Chery
(74) *Attorney, Agent, or Firm* — Sughrue Mion, PLLC (57) ABSTRACT

An information processing system includes: a storage device storing information including settings information configured to an information processing apparatus, attribute management information indicating whether each settings information item is limited information with an update limit to the settings information or non-limited information without an update limit to the settings information, and apparatus specification information for specifying the information processing apparatus; and an information processing apparatus including an input unit reading information from the storage device when the storage device is connected, a determining unit comparing the apparatus specification information read by the input unit with the apparatus specification information for specifying the information processing apparatus stored in a storage unit and determines whether the apparatus settings information read by the input unit is identical to the apparatus settings information of the information processing apparatus, and an update unit updating the settings information.

4 Claims, 11 Drawing Sheets

ATTRIBUTE MANAGEMENT TABLE

| ITEM | UPDATE LIMIT |
|---|---|
| MAIL ADDRESS | SET |
| FAX NUMBER | SET |
| POWER SAVING MODE | NOT SET |
| MEMORY SETTING | NOT SET |
| EXTERNAL ACCESS SETTING | NOT SET |
| MAIL NOTIFICATION SETTING | NOT SET |
| PORT SETTING | NOT SET |
| PROTOCOL SETTING | NOT SET |
| IP ADDRESS | SET |
| SCREEN DISPLAY INITIAL VALUE | NOT SET |
| LANGUAGE SETTING | NOT SET |
| FUNCTION SETTING INITIAL VALUE | NOT SET |
| ⋮ | ⋮ |

INFORMATION PROCESSING SYSTEM FOR TRANSMITTING SETTINGS INFORMATION FROM A PARENT PROCESSING APPARATUS TO A CHILD PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-068344 filed Mar. 25, 2011.

BACKGROUND (i) Technical Field

The present invention relates to an information processing system, an information processing method, and a non-transitory computer readable medium storing a program.

(ii) Related Art

Generally, a technique has been known in which the settings information of an information processing apparatus (hereinafter, referred to as a parent processing apparatus) with the settings information is stored in a storage device and other plural information processing apparatuses (hereinafter, referred to as child processing apparatuses) read the settings information of the parent processing apparatus stored in the storage device and update their settings information. In addition, a technique has been known in which the settings information of a parent processing apparatus is transmitted to a child processing apparatus through a network and the child processing apparatus updates its settings information with the received settings information of the parent processing apparatus.

SUMMARY

According to an aspect of the invention, there is provided an information processing system including: a storage device that stores information including settings information which is configured to an information processing apparatus in order to make the information processing apparatus perform a process, attribute management information indicating whether each settings information item is limited information with an update limit to the settings information or non-limited information without an update limit to the settings information, and apparatus specification information for specifying the information processing apparatus; and an information processing apparatus including an input unit that reads information from the storage device when the storage device is connected, a determining unit that compares the apparatus specification information read by the input unit with the apparatus specification information for specifying the information processing apparatus which is stored in a storage unit and determines whether the apparatus settings information read by the input unit is identical to the apparatus settings information of the information processing apparatus, and an update unit that reads settings information of the limited information and the non-limited information from the storage device through the input unit with reference to the attribute management information read by the input unit, stores the read settings information in the storage unit, and updates the settings information when the determining unit determines that the read apparatus specification information is identical to the apparatus settings information of the information processing apparatus, and reads the settings information of the non-limited information from the storage device through the input unit, stores the read settings information in the storage unit, and updates the settings information when the determining unit determines that the read apparatus specification information is not identical to the apparatus settings information of the information processing apparatus.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described with reference to the accompanying drawings.

[First Exemplary Embodiment]

Figure 1:
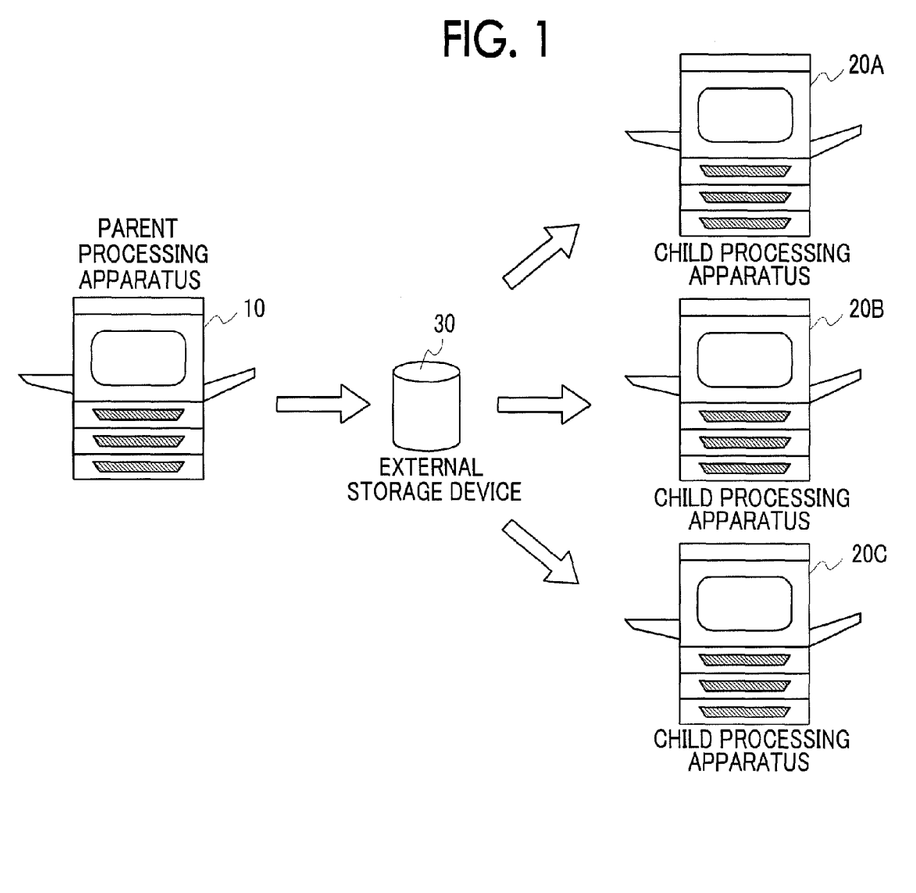
FIG. 1 is a diagram illustrating an example of the structure of a first exemplary embodiment.

First, a structure according to a first exemplary embodiment will be described with reference to FIG. 1. This exemplary embodiment includes a parent processing apparatus 10, child processing apparatuses 20A, 20B, and 20C, and an external storage device 30.

In this exemplary embodiment, the parent processing apparatus 10 and the child processing apparatuses 20A, 20B, and 20C function as, for example, multi-function machines having the functions of a printer, a copier, and a facsimile. In this exemplary embodiment, the external storage device 30 is a non-volatile memory, such as an SD memory card or a USB (Universal Serial Bus) memory, but is not limited thereto. For example, the external storage device 30 may be a personal computer or a copier. Three child processing apparatuses 20A, 20B, and 20C are shown in FIG. 1, but the number of child processing apparatuses is not limited to three. The child processing apparatuses 20A, 20B, and 20C have the same function. Therefore, when it is not necessary to particularly discriminate the child processing apparatuses 20A, 20B, and 20C, the child processing apparatuses 20A, 20B, and 20C are referred to as child processing apparatuses 20.

Figure 2:
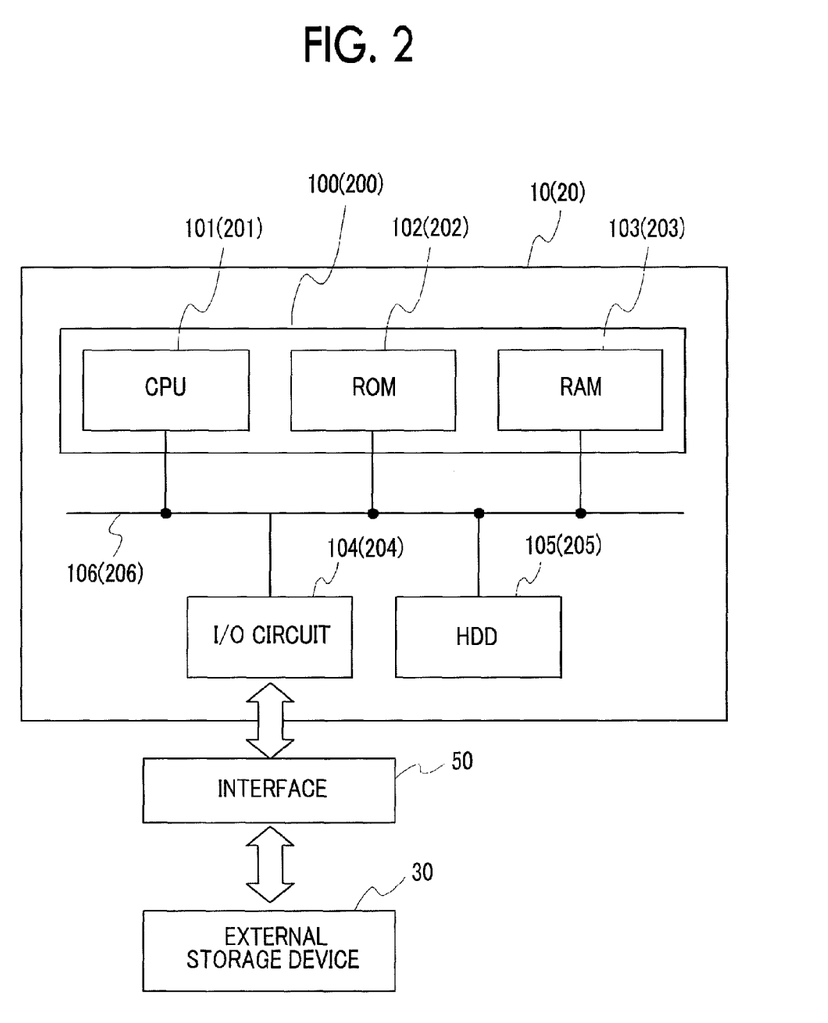
FIG. 2 is a diagram illustrating an example of the hardware structure of a parent processing apparatus and a child processing apparatus.

Next, the hardware structure of the parent processing apparatus 10 and the child processing apparatus 20 will be described with reference to FIG. 2. In this exemplary embodiment, since the parent processing apparatus 10 and the child processing apparatus 20 have substantially the same hardware structure, the hardware structure of the parent processing apparatus 10 will be described as a representative example. Among the numbers given to the hardware components shown in FIG. 2, numbers in parentheses are given to the hardware components of the child processing apparatus 20.

The parent processing apparatus 10 includes a control unit 100, an input/output circuit (hereinafter, referred to as an I/O circuit) 104, and a hard disk device (hereinafter, referred to as an HDD (Hard disk drive)) 105, which are connected through a bus line 106 so as to communicate with each other. The control unit 100 includes a CPU (Central Processing Unit) 101, a ROM (Read Only Memory) 102, and a RAM (Random Access Memory) 103.

The CPU 101 controls all processes of the parent processing apparatus 10 including a calculation process. The I/O circuit 104 outputs data transmitted from the control unit 100 to the external storage device 30 through an interface 50 that is connected to the external storage device 30, or it reads data from the external storage device 30 and transmits the data to the control unit 100.

The ROM 102 stores processing programs for implementing various kinds of processes performed under the control of the CPU 101. The RAM 103 is a primary storage device used when the various kinds of processes are performed. The RAM 103 stores settings information which is configured by the parent processing apparatus 10 to perform the processes, an attribute management table (which will be described in detail below) for managing the attribute of the settings information, and apparatus specification information for identifying the parent processing apparatus 10. The apparatus specification information is unique information for identifying the parent processing apparatus 10 and includes, for example, the serial number or Mac address of the apparatus. The content of information stored in the RAM 203 of the child processing apparatus 20 is the same as that of information in the RAM 103 of the parent processing apparatus 10. The settings information and the attribute management table will be described in detail below with reference to FIG. 3.

For example, when there are plural parent processing apparatuses 10, the HDD 105 stores image data input from an image input device, such as a scanner, or electronic data input from an external device, such as a personal computer. The settings information, the attribute management table, or the apparatus specification information stored in the RAM 103 (203) is stored in the HDD 105 (HDD 205) when the parent processing apparatus 10 (child processing apparatus 20) is turned off.

Figure 3:
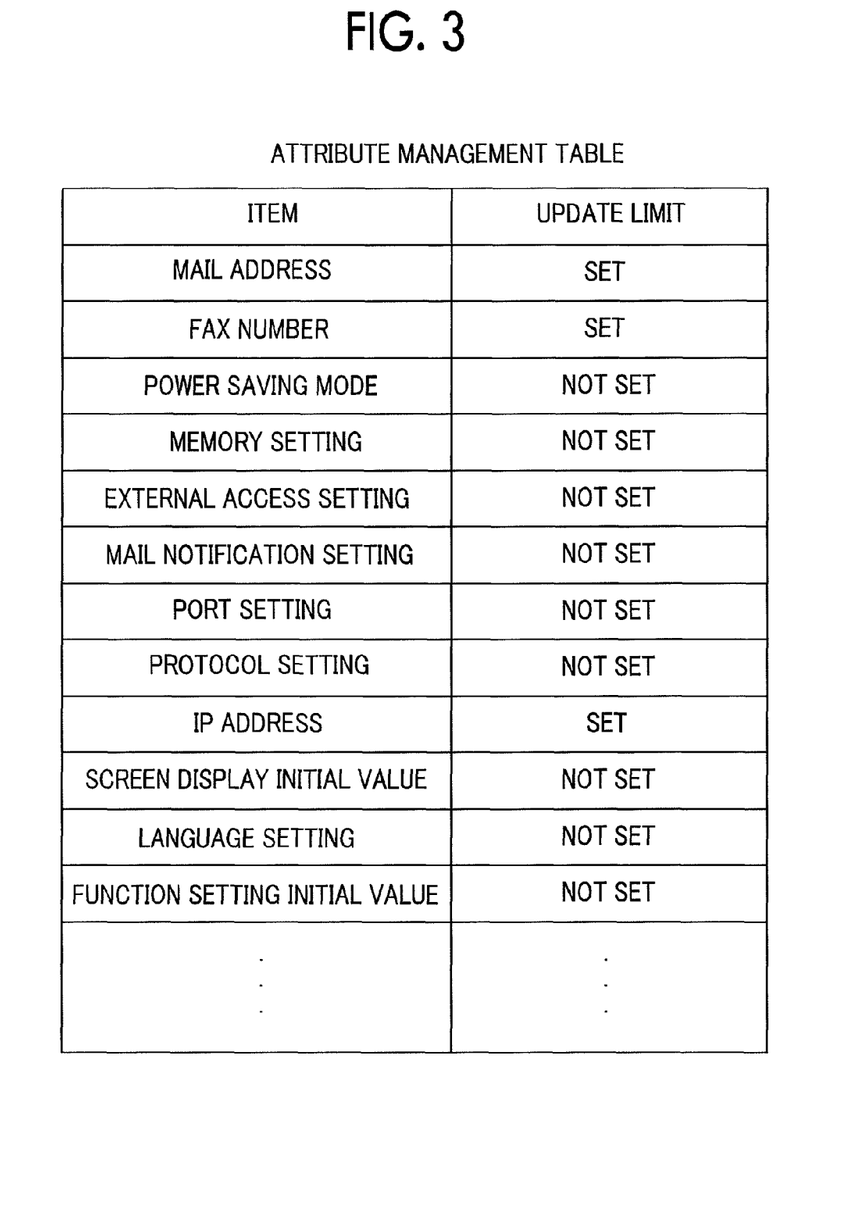
FIG. 3 is a diagram illustrating an example of an attribute management table.

Next, the settings information and the attribute management table stored in the RAM 103 will be described with reference to FIG. 3.

The settings information is configured to the parent processing apparatus 10 or each child processing apparatus 20 in order to operate the parent processing apparatus 10 or the child processing apparatus 20 and includes settings information to which an update limit is set and settings information to which an update limit is not set. The attribute management table is for managing whether an update limit is set to each settings information item configured to the parent processing apparatus 10. For example, when the settings of the parent processing apparatus 10 are reflected to the child processing apparatus 20, the settings information to which an update limit is set is not reflected to the settings of the child processing apparatus 20. The settings information of the parent processing apparatus 10 to which an update limit is not set is reflected to the settings of the child processing apparatus 20.

The settings information to which an update limit is set is unique information used by the parent processing apparatus 10, such as a mail address, a FAX number, and an IP address. When the settings information is reflected to the settings of the child processing apparatus 20, an error occurs in the operation of the child processing apparatus 20. The settings information to which an update limit is not set includes, for example, the setting of the power saving mode, the setting of a memory, the setting of the outgoing access, the setting of mail notification, the setting of a port, the setting of a protocol, the setting of a screen display initial value, the setting of a language, and a function setting initial value. The settings information to which an update limit is not set is configured to the parent processing apparatus 10. Even when the settings information to which an update limit is not set is reflected to the child processing apparatus 20, no error occurs in the operation of the child processing apparatus 20.

The operator may use an operation display unit (not shown) of the parent processing apparatus 10 to set or not to set the update limit. The settings information, such as the mail address, the FAX number, or the IP address, is unique settings information used by the parent processing apparatus 10 and the update limit of the settings information is not lifted. However, the operator may selectively input information to change the settings information to which an update limit is not set to the settings information to which an update limit is set.

Figure 4:
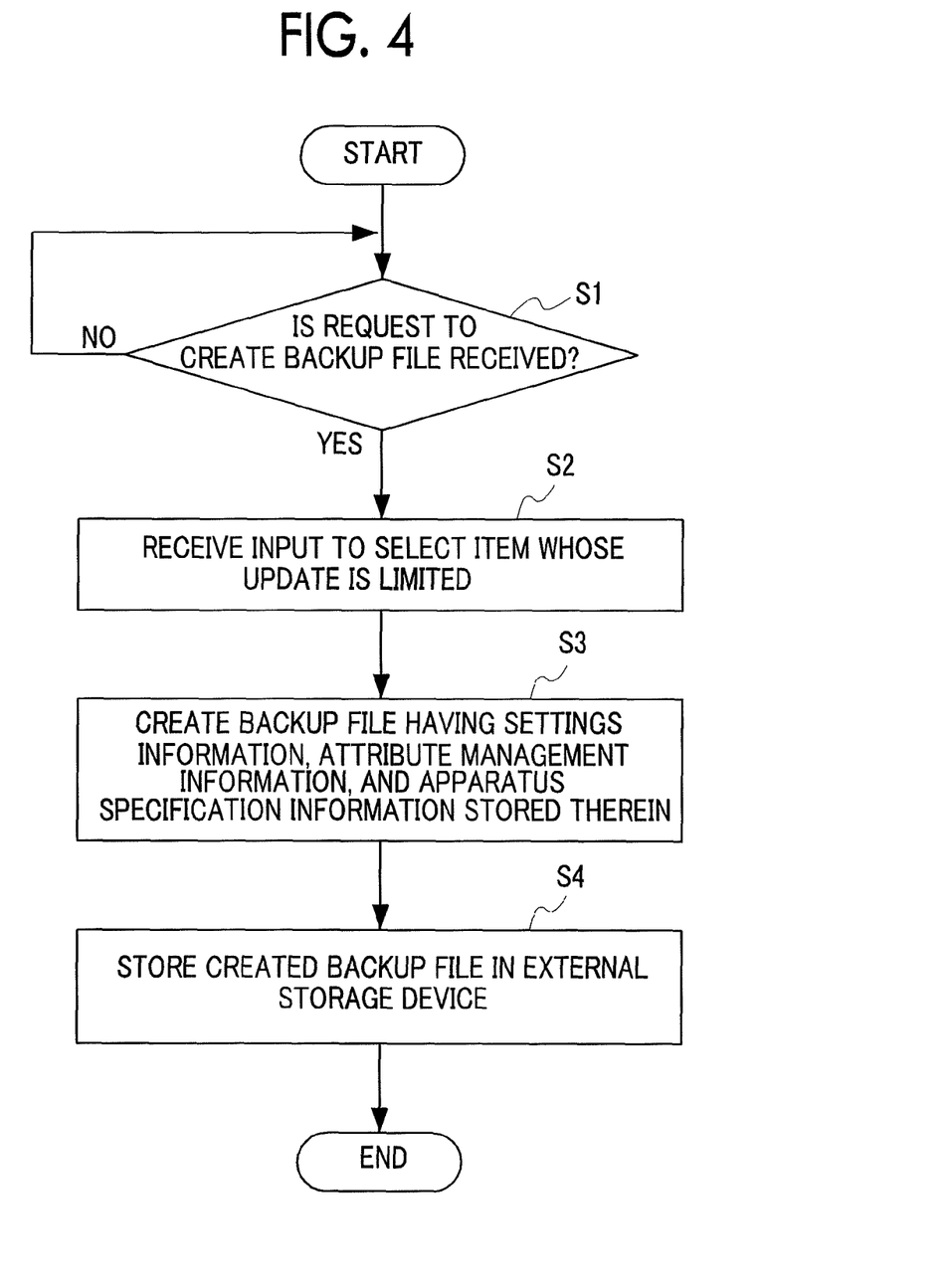
FIG. 4 is a flowchart illustrating a backup file creating process of the parent processing apparatus.

Next, the process of the parent processing apparatus 10 creating a backup file and storing the backup file in the external storage device 30 will be described with reference to FIG. 4. The backup file includes the settings information, information about the settings information whose update is limited (that is, information managed by the attribute management table shown in FIG. 3; hereinafter, referred to as attribute management information), the apparatus specification information for specifying the parent processing apparatus 10. The information stored in the backup file is used when the settings of the parent processing apparatus 10 are reflected to plural child processing apparatuses 20 such that the parent processing apparatus 10 and the child processing apparatuses 20 share settings. In addition, for example, the information stored in the backup file is used to restore the settings of the parent processing apparatus 10 when the parent processing apparatus 10 is out of order or when parts are replaced.

The operator operates the operation display unit (not shown) of the parent processing apparatus 10 to input a request to create a backup file. When receiving the request to create a backup file (Step S1/YES), the control unit 100 of the parent processing apparatus 10 displays a display screen on the operation display unit such that the operator selects the settings information whose update is limited. When receiving a selection input to select the settings information whose update is limited from the operator (Step S2), the control unit 100 rewrites the attribute management table shown in FIG. 3 according to the received selection input and creates attribute management information in which an update limit is set to the settings information selected by the operator.

Then, the control unit 100 creates a backup file and stores the settings information, the attribute management information, and the apparatus specification information in the backup file (Step S3). The settings information includes settings information to which an update limit is set and settings information to which an update limit is not set. The apparatus specification information is a unique identification number for identifying the parent processing apparatus 10 which is stored in the RAM 103. After storing the information in the backup file, the control unit 100 stores the backup file in the external storage device 30 (Step S4).

Next, the child processing apparatus 20 will be described. The hardware structure of the child processing apparatus 20 has been described with reference to FIG. 2 and thus a description thereof will not be repeated.

Figure 5:
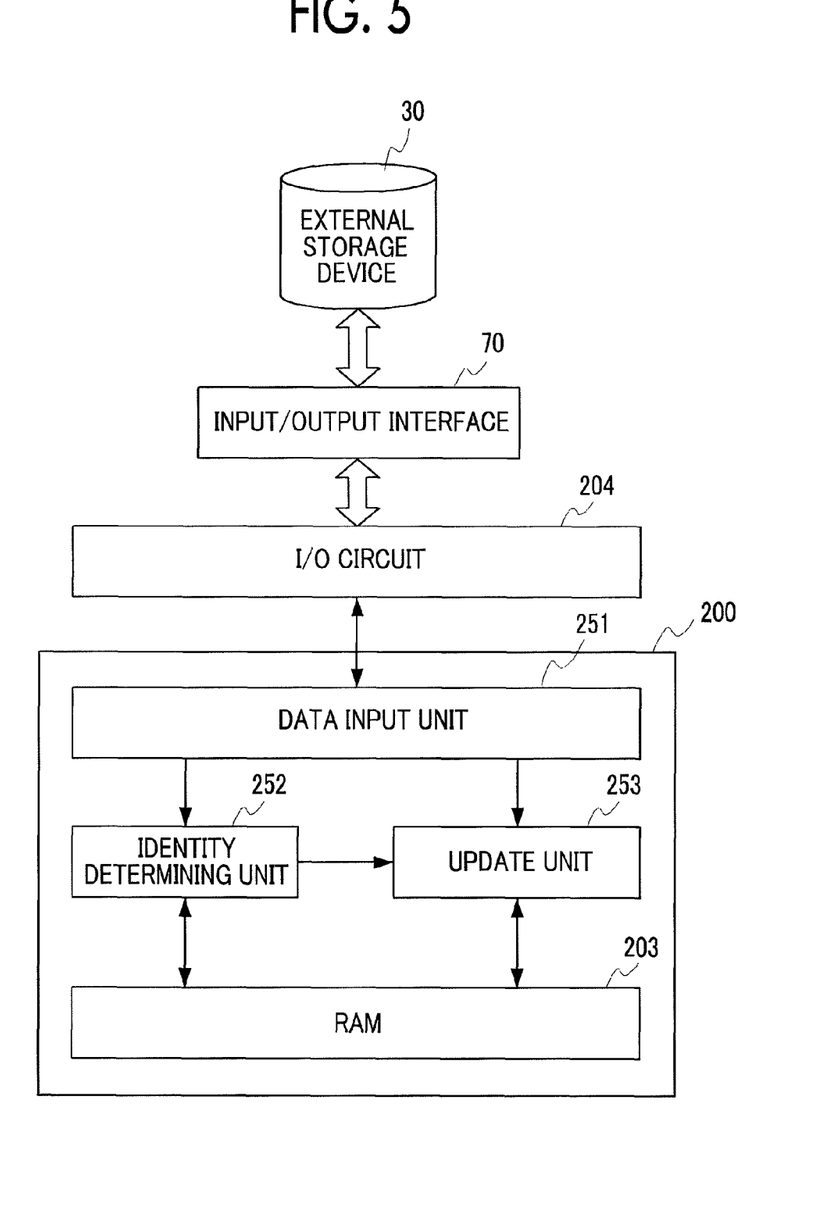
FIG. 5 is a diagram illustrating an example of a functional block implemented by control units of the parent processing apparatus and the child processing apparatus.

First, the functional block of a control unit 200 of the child processing apparatus 20 will be described with reference to FIG. 5. The functional block is a block for a predetermined function implemented by cooperation between hardware components, such as a CPU 201 and a RAM 203 of the control unit 200, and processing programs stored in the ROM 202. The control unit 100 of the parent processing apparatus 10 has the same functional block as the control unit 200 of the child processing apparatus 20. The information in the backup file stored in the external storage device 30 may be input to restore the settings of the parent processing apparatus 10.

The control unit 200 includes as functional blocks a data input unit 251, an identity determining unit 252, and an update unit 253.

The data input unit 251 reads data from the backup file in the external storage device 30 through an I/O circuit 204 and an input/output interface 70. The data input unit 251 reads data requested by the identity determining unit 252 or the update unit 253 from the external storage device 30.

The identity determining unit 252 receives the apparatus specification information read from the backup file in the external storage device 30 from the data input unit 251. The identity determining unit 252 compares the apparatus specification information of the parent processing apparatus 10 read from the backup file with the apparatus specification information of the child processing apparatus 20 read from the RAM 203. When it is determined that the apparatus specification information read from the backup file is not identical to the apparatus specification information of the child processing apparatus 20 read from the RAM 203, the identity determining unit 252 outputs the determination result indicating nonidentity to the update unit 253. In addition, when it is determined that the apparatus specification information read from the backup file is identical to the apparatus specification information of the child processing apparatus 20 read from the RAM 203, the identity determining unit 252 outputs the determination result indicating identity to the update unit 253.

The update unit 253 reads the attribute management information from the external storage device 30 through the data input unit 251. In addition, the update unit 253 receives the determination result indicating identity or nonidentity from the identity determining unit 252. When the determination result indicating nonidentity is received from the identity determining unit 252, the update unit 253 receives the settings information to which no update limit is set from the external storage device 30 with reference to the attribute management information. That is, when the determination result of the identity determining unit 252 indicates nonidentity, the settings information which is stored in the backup file and to which an update limit is set may be determined to be unique information of the parent processing apparatus 10. In this case, the update unit 253 reads the settings information to which no update limit is set from the external storage device 30 and updates the settings of the child processing apparatus 20 stored in the RAM 203.

When the external storage device 30 is connected to the parent processing apparatus 10, the apparatus specification information read from the backup file by the control unit 100 is identical to the apparatus specification information read from the RAM 203 by the control unit 100. In this case, the control unit 100 reads the settings information to which an update limit is set and the settings information to which no update limit is set from the external storage device 30 and updates the settings of the parent processing apparatus 10 stored in the RAM 103. Therefore, it is possible to restore the settings of the parent processing apparatus 10, for example, when the parent processing apparatus 10 is out of order or when parts are replaced.

Figure 6:
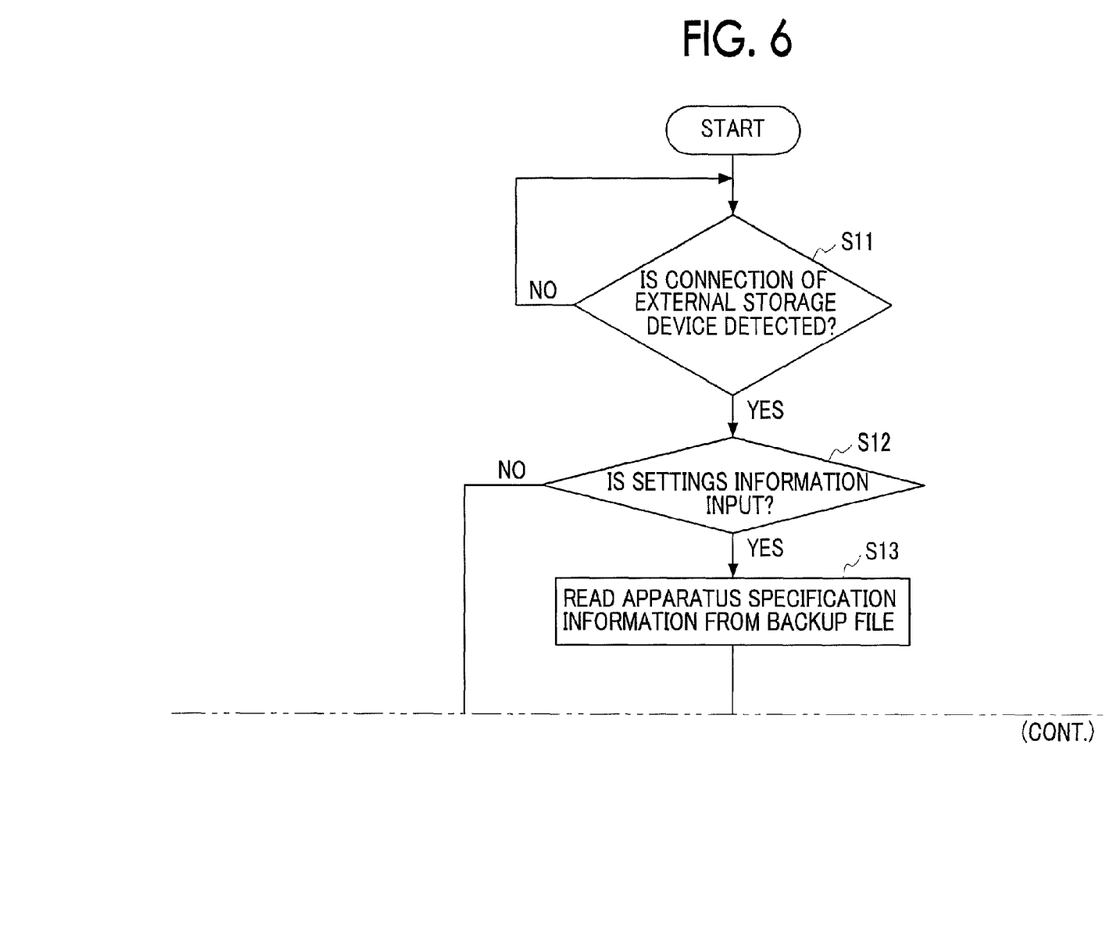
FIG. 6 is a flowchart illustrating the processes of the parent processing apparatus and the child processing apparatus when settings information is read from a backup file.

Next, the process between the parent processing apparatus 10 and the child processing apparatus 20 connected to the external storage device 30 will be described with reference to the flowchart shown in FIG. 6. The following process is common to the control unit 100 of the parent processing apparatus 10 and the control unit 200 of the child processing apparatus 20. Therefore, only the process of the control unit 100 (200) will be described below without particularly distinguishing the processes of the control unit 100 and the control unit 200.

When detecting the connection of the external storage device 30 (Step S11/YES), the control unit 100 (200) displays information indicating that the connection of the external storage device 30 has been detected and information for checking whether to read the settings information from the external storage device 30 on the operation display unit (not shown) (Step S12). When receiving information indicating that the settings information is not read from the external storage device 30 from the operator (Step S12/NO), the control unit 100 (200) ends the process. When receiving information indicating that the settings information is read from the external storage device 30 from the operator (Step S12/YES), first, the control unit 100 (200) reads the apparatus specification information from the backup file stored in the external storage device 30 (Step S13).

When reading the apparatus specification information, the control unit 100 (200) compares the read apparatus specification information with the apparatus specification information of a host apparatus read from the RAM 103 (203) (Step S14). When the apparatus specification information items are identical to each other (Step S14/YES), the control unit 100 (200) reads all settings information stored in the backup file and updates the settings information stored in the RAM 103 (203) (Step S15). When the apparatus specification information items are not identical to each other (Step S14/NO), the control unit 100 (200) reads the settings information to which no update limit is set from the backup file and updates the settings information stored in the RAM 103 (203) (Step 316).

As such, in this exemplary embodiment, the child processing apparatus 20 may read the settings information to which no update limit is set among the settings information items stored in the external storage device 30 and update its settings. Therefore, the unique settings information of the parent processing apparatus 10, which is the settings information to which an update limit is set, is not configured to the child processing apparatus 20. In addition, the parent processing apparatus 10 reads the settings information to which an update limit is set and the settings information to which no update limit is set, which are stored in the external storage device 30, and updates the settings information. Therefore, it is possible to restore the settings of the parent processing apparatus 10.

[Second Exemplary Embodiment]

Next, a second exemplary embodiment of the invention will be described with reference to the accompanying drawings. A description of the same structures as those in the first exemplary embodiment will not be repeated.

In a child processing apparatus 20 according to this exemplary embodiment, the information that has been previously set is stored in a RAM 203. Attribute management information indicating whether an update limit is set to each settings information item is configured to the information set in the child processing apparatus 20. The child processing apparatus 20 registers the attribute management information in the attribute management table and manages the attribute management table. The attribute management table of the child processing apparatus 20 has the same structure as the attribute management table of the parent processing apparatus 10 shown in FIG. 3 and is stored in the RAM 203 of the child processing apparatus 20.

An update limit is set to settings information items, such as a mail address, a FAX number, and an IP address, among the settings information items and the settings information items are not changed. However, settings information to which no update limit is set may be changed to the settings information to which an update limit is set by a selection input from the operator. Therefore, in some cases, the attribute management information of the parent processing apparatus 10 is different from the attribute management information of the child processing apparatus 20.

The control unit 200 of the child processing apparatus 20 stores, in the RAM 203, the settings information indicating attribute information with higher priority of the attribute management information stored in the RAM 203 and the attribute management information read from the backup file. The control unit 200 of the child processing apparatus 20 detects the connection of an external storage device 30. When detecting that the apparatus specification information read from the backup file is not identical to the apparatus specification information read from the RAM 203, the control unit 200 reads the settings information from the backup file. In this case, the control unit 200 (in particular, the update unit 253) reads the settings information according to the attribute management information with higher priority stored in the RAM 203, of the attribute management information stored in the external storage device 30 and the attribute management information of the child processing apparatus 20 stored in the RAM 203.

For example, when the attribute management information is not set to the child processing apparatus 20 or when the operator wants to overwrite the attribute management information of the parent processing apparatus 10 to the attribute management information set to the child processing apparatus 20, the attribute management information stored in the backup file is preferentially set as in the first exemplary embodiment. In addition, the attribute management information stored in the RAM 203 of the child processing apparatus 20 may be preferentially set and priority may be given to the settings of the attribute management information of the child processing apparatus 20. In neither the attribute management information stored in the backup file nor the attribute management information stored in the RAM 203 of the child processing apparatus 20, the settings information to which an update limit is set may not be updated with the settings information to which an update limit is set. In both the attribute management information stored in the backup file and the attribute management information stored in the RAM 203 of the child processing apparatus 20, the settings information to which an update limit is set may not be updated with the settings information to which an update limit is set.

According to this exemplary embodiment, the child processing apparatus 20 may select the settings information to which an update limit is set and the settings information to which no update limit is set. It is possible to select the settings information to be configured to the child processing apparatus 20.

[Third Exemplary Embodiment]

Next, a third exemplary embodiment of the invention will be described with reference to the accompanying drawings. A description of the same structures as those in the first exemplary embodiment will not be repeated.

Figure 7:
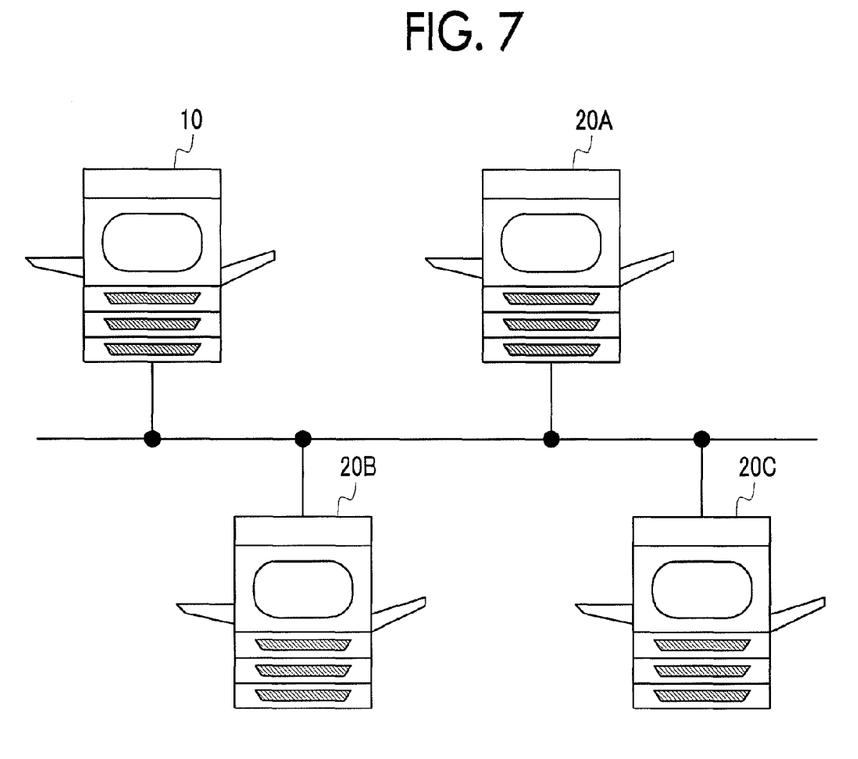
FIG. 7 is a diagram illustrating an example of the structure of a system according to a third exemplary embodiment.

FIG. 7 shows the structure of a system according to this exemplary embodiment. In this exemplary embodiment, a parent processing apparatus 10 and child processing apparatuses 20A, 20B, and 20C are connected to a network, such as a LAN (Local Area Network). In this exemplary embodiment, when creating a backup file, the parent processing apparatus 10 stores the creation date of the backup file in the backup file. That is, the backup file stores settings information, attribute management information, apparatus specification information, and the creation date of the backup file.

When an external storage device 30 is connected, the child processing apparatus 20 reads the creation date from the backup file. The child processing apparatus 20 transmits the read creation date to the parent processing apparatus 10 and inquires whether the backup file is the latest backup file. When receiving a response indicating that the backup file is the latest backup file from the parent processing apparatus 10, the child processing apparatus 20 reads the settings information from the backup file and updates its settings. When receiving a response indicating that the backup file is not the latest backup file from the parent processing apparatus 10, the child processing apparatus 20 requests the parent processing apparatus 10 to transmit the latest backup file. When receiving the latest backup file from the parent processing apparatus 10, the child processing apparatus 20 reads the settings information from the received backup file and updates its settings.

Figure 8:
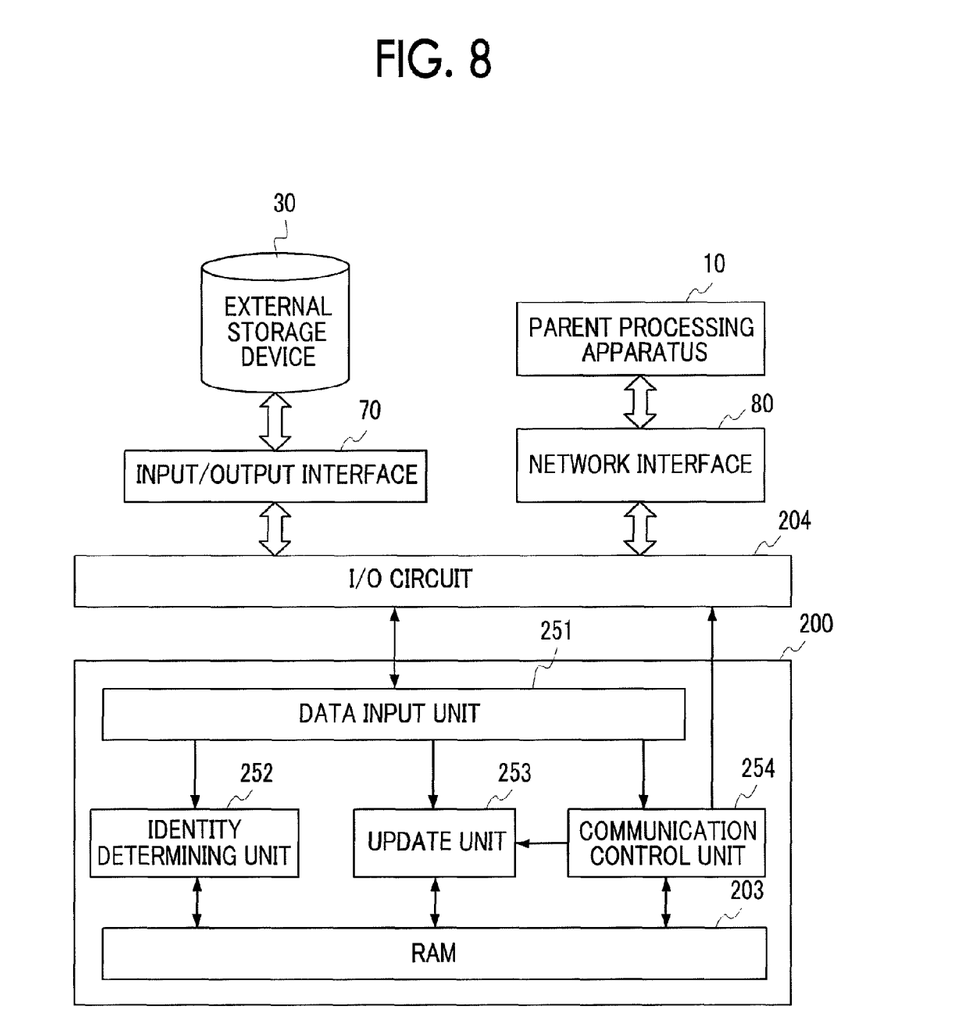
FIG. 8 is a diagram illustrating an example of a functional block implemented by a control unit of a child processing apparatus.

FIG. 8 is a functional block diagram illustrating the child processing apparatus 20 according to this exemplary embodiment. The control unit 200 further includes a communication control unit 254. The communication control unit 254 reads the creation date from the external storage device 30 through the data input unit 251. When reading the creation date, the communication control unit 254 creates a request to inquire whether the backup file having the read creation date added thereto is the latest file and transmits the request to the parent processing apparatus 10. When receiving a response indicating that the backup file is not the latest file from the parent processing apparatus 10, the communication control unit 254 requests the parent processing apparatus 10 to transmit the latest backup file. When receiving the latest backup file from the parent processing apparatus 10, the communication control unit 254 transmits the received latest backup file to the update unit 253. When receiving a response indicating that the backup file is the latest backup file from the parent processing apparatus 10, the communication control unit 254 notifies the update unit 253 that the backup file is the latest backup file.

When receiving a response indicating that the backup file stored in the external storage device 30 is the latest backup file from the communication control unit 254, the update unit 253 reads the settings information from the backup file stored in the external storage device 30, stores the settings information in the RAM 203, and updates the settings of the child processing apparatus 20. When receiving the latest backup file from the communication control unit 254, the update unit 253 reads the settings information from the received backup file, stores the settings information in the RAM 203, and updates the settings of the child processing apparatus 20.

Figure 9:
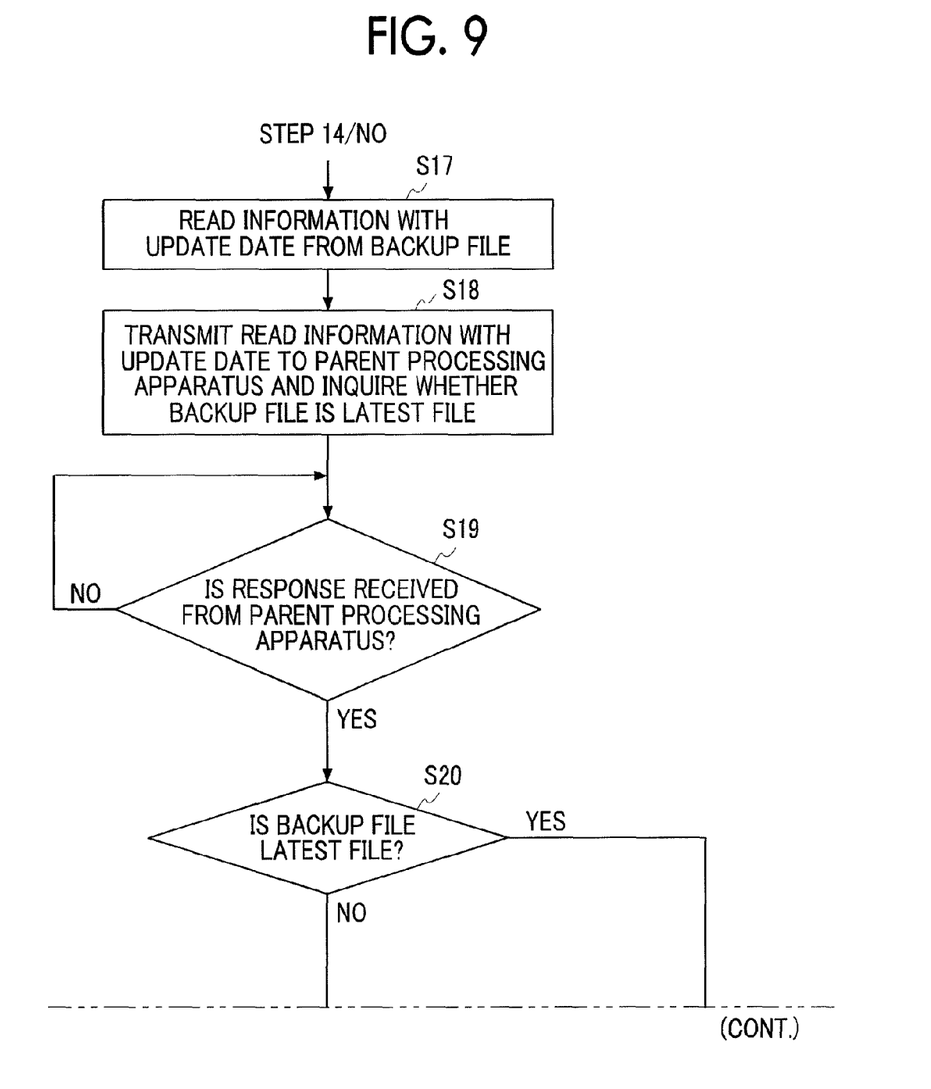
FIG. 9 is a flowchart illustrating the process of the child processing apparatus when settings information is read from the backup file.

Next, the process of the control unit 200 according to this exemplary embodiment will be described with reference to the flowchart shown in FIG. 9. The flowchart according to this exemplary embodiment is different from the flowchart shown in FIG. 6 in a process when the determination result in Step S14 is "NO" and the difference will be described below. The flowchart shown in FIG. 6 shows the process between the parent processing apparatus 10 and the child processing apparatus 20. However, the flowchart shown in FIG. 9 shows the process of the child processing apparatus 20.

When the apparatus specification information is read from the backup file, the control unit 200 compares the read apparatus specification information with the apparatus specification information of the host apparatus read from the RAM 203 (Step S14). When the apparatus specification information read from the backup file is not identical to the apparatus specification information of the host apparatus read from the RAM 203 (Step S14/NO), the control unit 200 reads the update date from the backup file (Step S17). Then, the control unit 200 transmits the read update date to the parent processing apparatus 10 and inquires whether the backup file stored in the external storage device 30 is the latest backup file (Step S18). When receiving a response from the parent processing apparatus 10 (Step S19/YES), the control unit 200 checks whether the backup file is the latest backup file with reference to the received response. When receiving a response indicating that the backup file is the latest backup file from the parent processing apparatus 10 (Step S20/YES), the control unit 200 reads the settings information from the backup file of the external storage device 30 (Step 823). The control unit 200 reads the settings information to which no update limit is set among the settings information items stored in the backup file, stores the settings information in the RAM 203, and updates the settings of the child processing apparatus 20 (Step S23). When receiving a response indicating that the backup file is not the latest backup file from the parent processing apparatus 10 (Step S20/NO), the control unit 200 requests the parent processing apparatus 10 to transmit the latest backup file (Step S21). Then, when receiving the latest backup file from the parent processing apparatus 10 (Step S22/YES), the control unit 200 reads the settings information from the received backup file (Step S24). The control unit 200 reads the settings information to which no update limit is set among the settings information items stored in the backup file, stores the read settings information in the RAM 203, and updates the settings of the child processing apparatus 20 (Step S24).

According to this exemplary embodiment, even when the backup file stored in the external storage device 30 is not the latest one, the latest backup file is provided to the child processing apparatus 20 and it is possible to set the latest information to the child processing apparatus 20.

In the third exemplary embodiment, the child processing apparatus 20 reads the settings information from the latest backup file. However, for example, when a response indicating that the backup file in the external storage device 30 is not the latest one is received from the parent processing apparatus 10, the child processing apparatus 20 may inquire of the parent processing apparatus 10 whether the settings information is allowed to be read from the backup file which is not the latest one. When a response indicating that the settings information is allowed to be read from the backup file which is not the latest one from the parent processing apparatus 10, the child processing apparatus 20 reads the settings information from the backup file in the external storage device 30.

The above-described exemplary embodiments are illustrative examples of the invention, but the invention is not limited to the above-described exemplary embodiments. Various modifications and changes of the invention can be made without departing from the scope and spirit of the invention. For example, in the first exemplary embodiment, the parent processing apparatus 10 receives the settings information to which an update limit is set and the settings information to which no update limit is set from the external storage device 30 since the apparatus specification information read from the external storage device 30 is identical to its apparatus specification information (apparatus specification information stored in the RAM 103). However, in this case, the parent processing apparatus 10 may be set so as not to read the settings information to which an update limit is set, and display information inquiring whether to read the settings information to which an update limit is set on the operation display unit. When receiving an operation input to allow the reading of the settings information from the user, the parent processing apparatus 10 may read the settings information to which an update limit is set.

In the third exemplary embodiment, when reading the date information from the external storage device 30, the child processing apparatus 20 automatically inquires of the parent processing apparatus 10 whether the backup file is the latest file. However, in this case, the child processing apparatus 20 may display information checking whether to inquire of the parent processing apparatus 10 whether the backup file is the latest one on the operation display unit. When receiving an input to perform the inquiry from the user, the child processing apparatus 20 may inquire of the parent processing apparatus 10 whether the backup file is the latest file.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a storage device that stores information including settings information which is configured to an information processing apparatus in order to make the information processing apparatus perform a process, attribute management information indicating whether each settings information item is limited information with an update limit to the settings information or non-limited information without an update limit to the settings information, and apparatus specification information for specifying the information processing apparatus; and
an information processing apparatus including an input unit that reads information from the storage device when the storage device is connected, a determining unit that compares the apparatus specification information read by the input unit with the apparatus specification information for specifying the information processing apparatus which is stored in a storage unit and determines whether the apparatus settings information read by the input unit is identical to the apparatus settings information of the information processing apparatus, and an update unit that reads settings information of the limited information and the non-limited information from the storage device through the input unit with reference to the attribute management information read by the input unit, stores the read settings information in the storage unit, and updates the settings information when the determining unit determines that the read apparatus specification information is identical to the apparatus settings information of the information processing apparatus, and reads the settings information of the non-limited information from the storage device through the input unit, stores the read settings information in the storage unit, and updates the settings information when the determining unit determines that the read apparatus specification information is not identical to the apparatus settings information of the information processing apparatus, wherein the information processing apparatus includes a parent information processing apparatus that stores information thereof in the storage device and a child information processing apparatus that reads the non-limited information among the information items of the parent information processing apparatus stored in the storage device and changes the settings thereof to the settings of the parent information processing apparatus, the child information processing apparatus stores information including settings information of the child information processing apparatus which is configured in advance in the storage unit, attribute management information indicating whether each settings information item is the limited information with an update limit to the settings information or the non-limited information without an update limit to the settings information, and apparatus specification information for specifying the child information processing apparatus, and the update unit notifies the input unit of the settings information which is designated to be read from the storage device such that the input unit reads the designated settings information, according to the attribute management information with a priority higher than a predetermined value, of the attribute management information of the parent information processing apparatus read from the storage device and the attribute management information of the child information processing apparatus stored in the storage unit.

2. The information processing system according to claim 1, the storage device further stores date information indicating the date at which the information of the parent information processing apparatus is stored, the parent information processing apparatus and the child information processing apparatus include communication units that are connected to a communication line and perform communication between the parent information processing apparatus and the child information processing apparatus, the child information processing apparatus reads the date information from the storage device, transmits the read date information to the parent information processing apparatus through the communication unit, and inquires of the parent information processing apparatus whether the information stored in the storage device is the latest information, when receiving a response indicating that the information is the latest information from the parent information processing apparatus, the child information processing apparatus reads the settings information of the non-limited information stored in the storage device, stores the read settings information in the storage unit, and updates the settings information, and when receiving a response indicating that the information is not the latest information from the parent information processing apparatus, the child information processing apparatus receives the latest information from the parent information processing apparatus through the communication unit, reads the settings information of the non-limited information from the received information, stores the read settings information in the storage unit, and updates the settings information.

3. An information processing method comprising:

reading information from a storage device storing the information including settings information which is configured to an information processing apparatus in order to make the information processing apparatus perform a process, attribute management information indicating whether each settings information item is limited information with an update limit to the settings information or non-limited information without an update limit to the settings information, and apparatus specification information for specifying the information processing apparatus;

comparing the read apparatus specification information with the apparatus specification information for specifying the information processing apparatus which is stored in a storage unit and determining whether the read apparatus settings information is identical to the apparatus settings information of the information processing apparatus;

reading settings information of the limited information and the non-limited information from the storage device with reference to the attribute management information, storing the read settings information in the storage unit, and updating the settings information when it is determined that the read apparatus specification information is identical to the apparatus settings information of the information processing apparatus; and reading the settings information of the non-limited information from the storage device, storing the read settings information in the storage unit, and updating the settings information when it is determined that the read apparatus specification information is not identical to the apparatus settings information of the information processing apparatus, wherein the information processing apparatus includes a parent information processing apparatus that stores information thereof in the storage device and a child information processing apparatus that reads the non-limited information among the information items of the parent information processing apparatus stored in the storage device and changes the settings thereof to the settings of the parent information processing apparatus, the child information processing apparatus stores information including settings information of the child information processing apparatus which is configured in advance in the storage unit, attribute management information indicating whether each settings information item is the limited information with an update limit to the settings information or the non-limited information without an update limit to the settings information, and apparatus specification information for specifying the child information processing apparatus, and notifying of the settings information which is designated to be read from the storage device such that the designated settings information is read, according to the attribute management information with a priority higher than a predetermined value, of the attribute management information of the parent information processing apparatus read from the storage device and the attribute management information of the child information processing apparatus stored in the storage unit.

4. A non-transitory computer readable medium storing a program that causes a computer to function as:

an input unit that reads information from a storage device storing the information including settings information which is configured to an information processing apparatus in order to make the information processing apparatus perform a process, attribute management information indicating whether each settings information item is limited information with an update limit to the settings information or non-limited information without an update limit to the settings information, and apparatus specification information for specifying the information processing apparatus;

a determining unit that compares the apparatus specification information read by the input unit with the apparatus specification information for specifying the information processing apparatus which is stored in a storage unit and determines whether the apparatus settings information read by the input unit is identical to the apparatus settings information of the information processing apparatus; and an update unit that reads settings information of the limited information and the non-limited information from the storage device through the input unit with reference to the attribute management information read by the input unit, stores the read settings information in the storage unit, and updates the settings information when the determining unit determines that the read apparatus specification information is identical to the apparatus settings information of the information processing apparatus, and reads the settings information of the non-limited information from the storage device through the input unit, stores the read settings information in the storage unit, and updates the settings information when the determining unit determines that the read apparatus specification information is not identical to the apparatus settings information of the information processing apparatus, wherein the information processing apparatus includes a parent information processing apparatus that stores information thereof in the storage device and a child information processing apparatus that reads the non-limited information among the information items of the parent information processing apparatus stored in the storage device and changes the settings thereof to the settings of the parent information processing apparatus, the child information processing apparatus stores information including settings information of the child information processing apparatus which is configured in advance in the storage unit, attribute management information indicating whether each settings information item is the limited information with an update limit to the settings information or the non-limited information without an update limit to the settings information, and apparatus specification information for specifying the child information processing apparatus, and the update unit notifies the input unit of the settings information which is designated to be read from the storage device such that the input unit reads the designated settings information, according to the attribute management information with a priority higher than a predetermined value, of the attribute management information of the parent information processing apparatus read from the storage device and the attribute management information of the child information processing apparatus stored in the storage unit.

* * * * *